United States Patent [19]
Atou et al.

[11] Patent Number: 6,111,764
[45] Date of Patent: Aug. 29, 2000

[54] POWER FAILURE-FREE POWER SUPPLY APPARATUS

[75] Inventors: Satoshi Atou; Haruhiko Ikeda; Hitoshi Mikami, all of Tokyo, Japan

[73] Assignee: Sanyo Denki Co., Ltd., Tokyo, Japan

[21] Appl. No.: 09/415,969

[22] Filed: Oct. 12, 1999

[30] Foreign Application Priority Data

Oct. 12, 1998 [JP] Japan .................................. 10-288956

[51] Int. Cl.$^7$ ............................... H02M 5/40; H02J 7/14
[52] U.S. Cl. .................. 363/37; 307/66; 307/86
[58] Field of Search ................. 307/48, 64, 65, 307/66, 80, 82, 85, 86, 87; 363/34, 37

[56] References Cited

U.S. PATENT DOCUMENTS

| | | | |
|---|---|---|---|
| 4,641,042 | 2/1987 | Miyazawa | 307/66 |
| 5,767,591 | 6/1998 | Pinkerton | 363/37 X |
| 5,856,712 | 1/1999 | Suzuki et al. | 363/34 X |

FOREIGN PATENT DOCUMENTS

9-285135  10/1997  Japan .

Primary Examiner—Jessica Han
Attorney, Agent, or Firm—Pearne & Gordon LLP

[57] ABSTRACT

A power failure-free power supply apparatus capable of minimizing time required for parallel operation of a power rectifier and a power rectifier/inverter, to thereby minimize a deterioration in operational reliability. The power rectifier converts an output of an AC power supply into DC power. A power inverter converts DC power into AC one. The power rectifier/inverter carries out rectifying/inverting operation. An output of the power rectifier and an AC output of the power rectifier/inverter are fed through a change-over unit to a load. Operation of switches is controlled depending on a detection signal of a current detector for detecting a charging current of a storage battery. A control unit permits parallel operation of the power rectifier and power rectifier/inverter when a residual capacity of the storage battery is at an increased level and permits the storage battery to be charged when the residual capacity is at a reduced level. An increase in charging current during the parallel operation minimizes time required for the parallel operation.

10 Claims, 3 Drawing Sheets

POWER FAILURE-FREE POWER SUPPLY APPARATUS

BACKGROUND OF THE INVENTION

This invention relates to a power failure-free power supply apparatus, and more particularly to a power failure-free power supply apparatus increased in operational reliability.

A computer has been increasingly involved in daily life. Incorporation of a computer in an important system does not permit any shutdown of the system in order to avoid damage to the computer. Also accidental power failure possibly causes damage to a software of a computer. Thus, a computer is generally equipped with a power failure-free power supply apparatus to prevent power failure of a commercial power supply from adversely affecting the computer, so that feed to the computer may be ensured irrespective of power failure of the commercial power supply.

Figure 5:
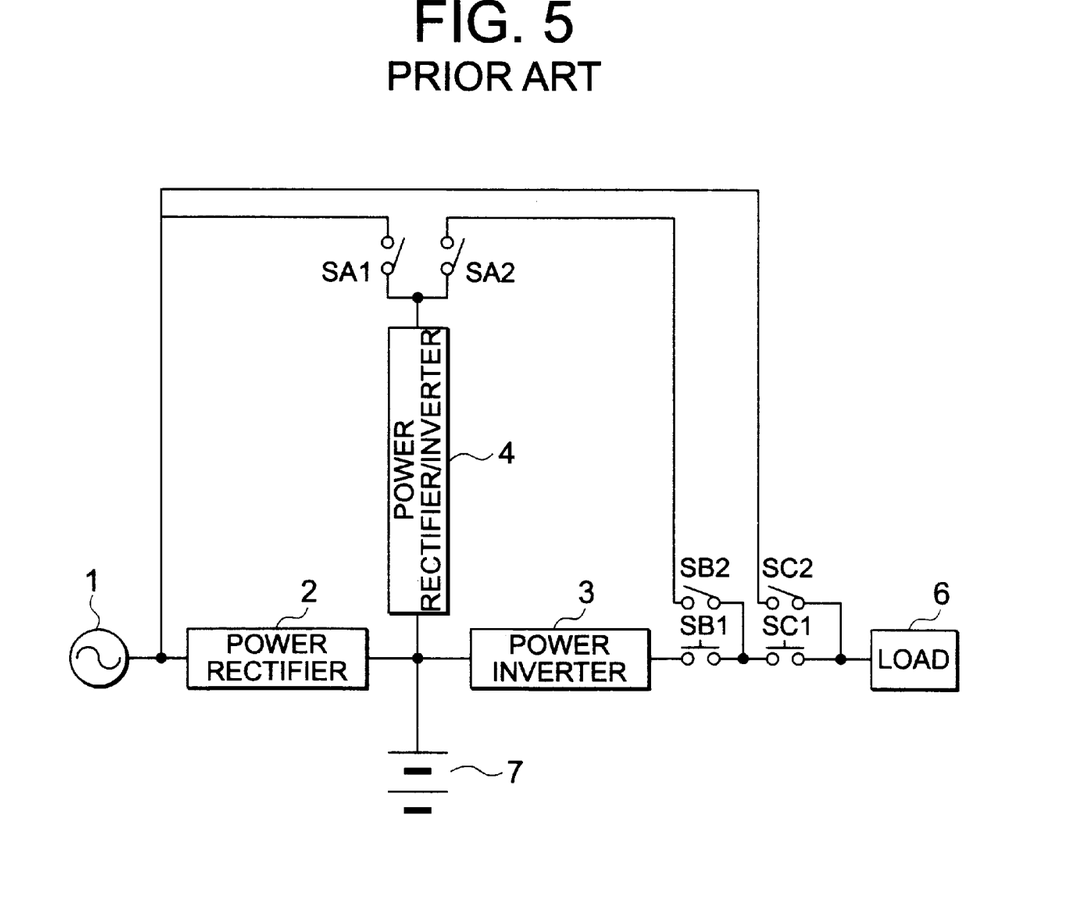
FIG. 5 is a block diagram showing a conventional power failure-free power supply apparatus.

A conventional power failure-free power supply apparatus is disclosed in Japanese Patent Application Laid-Open Publication No. 285135/1997. Now, the conventional power supply apparatus will be described with reference to FIG. 5. In FIG. 5, reference numeral 1 designates an AC power supply, for which a commercial power supply is generally used. 2 is a power rectifier, 3 is a power inverter, 4 is a power rectifier/inverter, 6 is a load, and 7 is a storage battery. The power rectifier 2 is connected to the AC power source 1 and the power inverter 3 is connected to the load 6 through selection switches SB1 and SC1. The power rectifier/inverter 4 is connected through a selection switch AS 1 to the AC power supply 1, as well as through switches SA2 and SB" and the selection switch SC1 to the load 6. Also, the AC power supply 1 is connected through a selection switch SC2 to the load 6. The converters 2, 3 and 4 each have a DC terminal connected to the storage battery 7.

The conventional power failure-free power supply apparatus thus constructed is basically operated according to a normal operation mode, an operation mode during power failure, an operation mode during failure of the power inverter and an operation mode during failure of the power rectifier.

The normal operation mode is an operation mode wherein the power rectifier 2 and power inverter 3 are operable. The selection switches SB1, SC1 and SA2 are kept closed and the selection switches SA1, SB2 and SC2 are kept open. The power rectifier 2 converts AC power of the AC power supply 1 into DC power to feed it to the power inverter 3 and charge the storage battery 7. The power inverter 3 feeds AC power to the load 6. The power rectifier/inverter 4 carries out stand-by operation in reserve when any failure occurs in the power inverter 3.

The operation mode during power failure is an operation mode carried out when power failure occurs in the AC power supply, wherein power discharged from the storage battery 7 is fed to the load 6. When power failure occurs in the AC power supply 1, the power rectifier 2 is kept from operation and the power inverter 3 converts DC power obtained due to discharge of the storage battery 7 into AC power to feed it to the load 6. At this time, the power rectifier/inverter 4 carried out stand-by operation which permits DC power of the storage battery 6 to be converted into AC power.

The operation mode during failure of the power inverter is an operation mode carried out in the case that failure occurs in the power inverter 3 which feeds the load 6. When failure occurs in the power inverter 3, the selection switch SB1 is rendered open and the selection switch SB is closed, resulting in the power rectifier 4 which has carried out stand-by operation feeding AC power to the load 6. After repair or replacement of the power inverter 3, the selection switch SB is rendered open and the selection switch is closed, so that the power supply apparatus may be returned to the normal operation mode.

The operation mode during failure of the power rectifier is an operation mode taking place when failure occurs in the power rectifier 2. When the power rectifier fails, the power inverter 3 converts DC power of the storage battery 7 into AC power to feed it to the load 6. The selection switch SA2 is open to permit the power rectifier/inverter 4 which has carried out stand-by operation to act as a power rectifier for converting AC power into DC power, resulting in the switch AS 1 being closed. This permits the storage battery 7 to be charged from the AC power supply 1 through the power rectifier/inverter 4 and DC power to be fed to the power inverter 3. After repair of the power rectifier 2, the selection switch SA1 is rendered open to permit the power rectifier/inverter 4 to carry out power rectification, leading to turning-on of the selection switch SA 2, so that the apparatus may be returned to the normal operation mode.

The operation mode during a plurality of failures is an operation mode carried out when failure occurs in two of the conversion units 2, 3 and 4. The election switches SC1 and SC2 are open and closed, respectively, resulting in AC power being fed from the AC power supply 1 directly to the load 6. After failure of the converters is repaired, the apparatus is returned to the normal operation mode.

The mode of charging the storage battery increased in capacity is an operation mode taking place when the storage battery increased in capacity to a degree sufficient to permit the load to satisfactorily operate during power failure of the AC power supply over a long period of time is charged. An increase in capacity of the storage battery 7 causes much power to be required to charge the battery 7, so that charging of the storage battery using only the power rectifier 2 having a capacity determined depending on a capacity of the power inverter 3 requires much time. Thus, charging of the storage battery 7 is carried out by changing over a mode of the power rectifier/inverter 4 into a power rectifier mode and subjecting the units 4 and 2 to parallel operation. This permits power for charging the storage battery 7 to be doubled.

However, it was found that the conventional power failure-free power supply apparatus has several problems.

More particularly, incorporation of the storage battery increased in capacity into the power supply apparatus permits the power rectifier/inverter to carry out power rectifying operation, to thereby subject the power rectifier and power rectifier/inverter to parallel operation, resulting in a charging current to the storage battery being increased. The parallel operation fails to permit the power rectifier/inverter to be in reserve for the power inverter, resulting in operational reliability being deteriorated as compared with during normal operation wherein the power rectifier/inverter carries out power inverting operation for stand-by operation. Thus, it is required to increase the charging current as much as possible to rapidly charge the storage battery during the parallel operation. Unfortunately, the prior art fails to fully consider that the charging current is increased during the parallel operation.

There occurs a difference in converted power between the parallel operation of the power rectifier/inverter and power rectifier and sole operation of any one of both. However, when a charging current of the storage battery is subject to restriction so that the converted power of the power rectifier for charging the storage battery during the normal operation does not exceed a capacity of the power rectifier or is not excessive, the charging current when the parallel operation is carried out is limited to a level twice as high as the charging current fed by only the power rectifier. Thus, the parallel operation fails to effectively utilize a sum of capacities of the power rectifier/inverter and power rectifier, even when the sum is surplus.

SUMMARY OF THE INVENTION

The present invention has been made in view of the foregoing disadvantage of the prior art.

Accordingly, it is an object of the present invention to provide a power failure-free power supply apparatus which is capable of minimizing time during which a power rectifier and a power rectifier/inverter is subject to parallel operation, to thereby enhance operational reliability thereof.

It is another object of the present invention to provide a power failure-free power supply apparatus which is capable of permitting a charging current during parallel operation of a power rectifier and a power rectifier/inverter to be increased to the utmost to rapidly charge a storage battery and protecting each of converters from an excessive charging current when the power rectifier or power rectifier/inverter is solely operated to charge the battery.

In accordance with the present invention, a power failure-free power supply apparatus is provided. The power failure-free power supply apparatus includes a power rectifier including an AC terminal and a DC terminal and converting AC power into DC power, a power inverter including an AC terminal and a DC terminal and converting DC power into AC power, a power rectifier/inverter including an AC terminal and a DC terminal and selectively carrying out both power rectification for converting AC power into DC power and power inversion for converting DC power into AC power, a storage battery including a DC terminal of which one end is connected to a common connection of the DC terminals of the power rectifier, power inverter and power rectifier/inverter, a current detector arranged between the common connection and the battery to detect a charging current of the storage battery, and a control unit controlling operation of at least the power rectifier and power rectifier/inverter. In the present invention, the AC terminals and DC terminals each are not limited to the form of a so-called terminal. They may be in the form of a wiring. The control unit controls operation of the power rectifier and power rectifier/inverter so as to charge the storage battery by means of the power rectifier and power rectifier/inverter when a residual capacity of the storage battery is reduced and charge the storage battery by means of only one of the power rectifier and power rectifier/inverter when the residual capacity is increased while preventing the charging current from exceeding an upper limit set level depending on an output of the current detector. The residual capacity of the storage battery may be obtained, for example, as a difference between an integrated or accumulated value of charged power of the storage battery and an accumulated value of power discharged therefrom.

In the present invention, the parallel operation of the power rectifier and power rectifier/inverter is carried out so as to prevent the charging current from exceeding the upper limit set level, to thereby increase the charging current to the utmost, resulting in the storage battery being rapidly charged.

In a preferred embodiment of the present invention, the upper limit set level when the storage battery is charged by the power rectifier and power rectifier/inverter is determined on the basis of a sum of capacities of the power rectifier and power rectifier/inverter. Also, the upper limit set level when the storage battery is charged by only one of the power rectifier and power rectifier/inverter is determined on the basis of a capacity of one of the power rectifier and power rectifier/inverter which is reduced in capacity. Thus, the upper limit set level is variably determined between the parallel operation and the sole operation. Such determination of the upper limit set level of the charging current permits the storage battery to be charged with a substantially increased charging current during the parallel operation. Thus, the parallel operation permits the storage battery to be rapidly charged, to thereby reduce time required to transfer the apparatus from the parallel operation to the sole operation. Also, such an increase in charging current does not lead to damage to the semiconductor switching elements for the power rectifier and power rectifier/inverter in the sole operation, because the upper limit set level when the parallel operation is changed to the sole operation is determined on the basis of one of the power rectifier and power rectifier/inverter which is reduced in capacity. Thus, the present invention effectively prevents an increase in charging current during the parallel operation from deteriorating operational reliability of the apparatus.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a power failure-free power supply apparatus according to the present invention will be described with reference to FIGS. 1 to 4.

Figure 1:
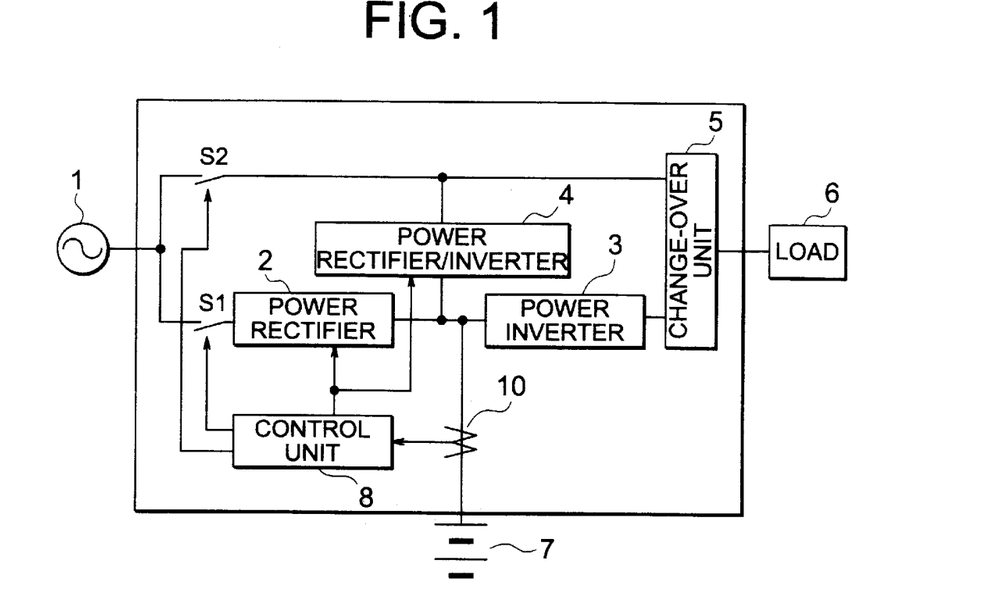
FIG. 1 is a block diagram showing an embodiment of a power failure-free power supply apparatus according to the present invention.
Figure 2:
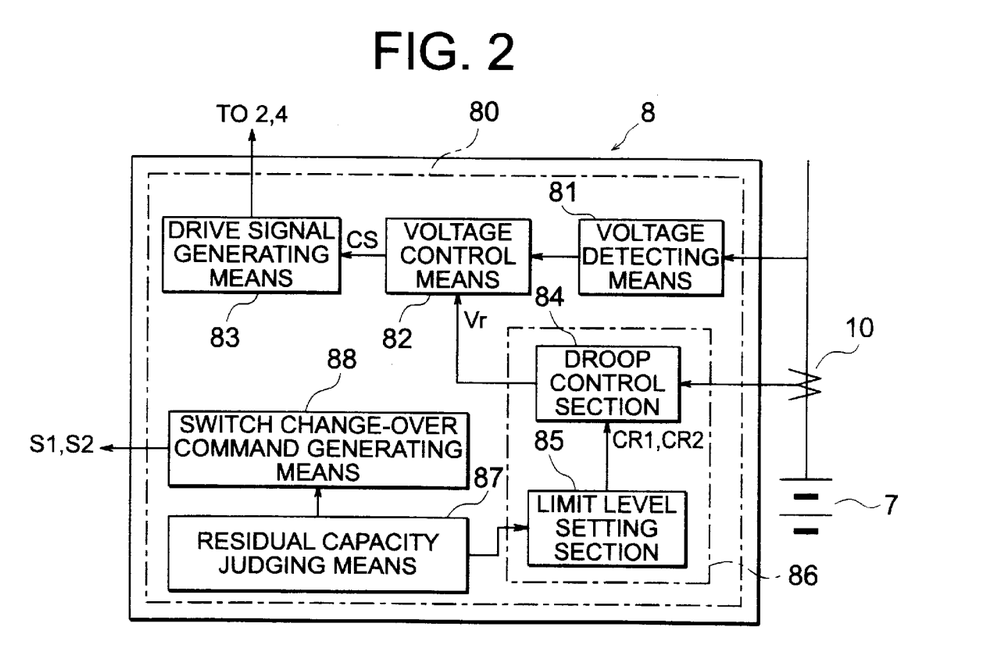
FIG. 2 is a block diagram showing a limit unit incorporated in the power failure-free power supply apparatus shown in FIG. 1.

Referring first to FIGS. 1 and 2, an embodiment of a power failure-free power supply apparatus according to the present invention is illustrated. In FIG. 1, a plurality of wirings are indicated by a single line for the sake of brevity. A power failure-free power supply apparatus of the illustrated embodiment includes an AC power supply 1 which may be generally constituted by a commercial power supply. A power rectifier 2 is connected through a first switch S1 to the AC power supply 1. The first switch S1 may be constituted of three switch elements when the AC power supply is, for example, a three-phase one. The power rectifier 2 includes a plurality of AC terminals and two or positive and negative DC terminals. The power rectifier 2 includes a bridge circuit in which a plurality of semiconductor switching elements such as transistors or the like are subject to bridge-connection and functions as an AC/DC converter for converting AC power into DC power, which may be constructed in such a manner as known in the art. Reference numeral 3 designates a power inverter, which likewise includes a plurality of AC terminals and two or positive and negative DC terminals. The power inverter 3 includes a bridge circuit wherein a plurality of semiconductor switches are subject to bridge connection and acts as an DC/AC converter for converting DC power into AC power, which likewise may be constructed in such a manner as known in the art. The power rectifier 2 and power inverter 3 may be constructed in such a manner as shown in, for example, FIG. 5 of Japanese Patent Application Laid-Open Publication No. 285135/1997 described above.

Reference numeral 4 designates a power rectifier/inverter, which likewise includes a plurality of AC terminals and two positive and negative DC terminals and is constructed so as to selectively carry out power rectification for converting AC power to DC power and power inversion for converting DC power to AC power. The power rectifier/inverter 4 has an AC terminal connected to the AC power supply 1 through a second switch S2. The second switch S2 is constituted by three switch elements when the AC power supply is, for example, a three-phase one. Also, the AC terminal of the power rectifier/inverter 4 is connected through a changer-over unit 5 to a load 6. The power rectifier/inverter 4 may be constructed in such a manner as shown in FIG. 2 of Japanese Patent Application Laid-Open Publication No. 285135/1997 by way of example.

The positive DC terminals of the power rectifier 2, power inverter 3 and power rectifier/inverter 4 are connected together at a common connection. The common connection of the positive DC terminals has a positive terminal of a storage battery 7 connected thereto through a connection line. The connection line for connecting the common connection and the positive terminal of the storage battery 7 to each other has a current detector 10 arranged thereon, which functions to measure or detect a DC current (charging current, discharge current) flowing through the connection line.

Also, the power supply apparatus of the illustrated embodiment includes a control unit 8. The control unit 8 functions to prevent a charging current of the storage battery 7 from exceeding a predetermined upper limit set value or level depending on an output of the current detector 10. Thus, the control unit 8 controls change-over of the first and second change-over units S1 and S2 and operation of the power rectifier 2 and power rectifier/inverter 4 so as to permit the storage battery 7 to be charged by means of the power rectifier 2 and power rectifier/inverter 4 when a residual capacity of the storage battery 7 is reduced and permit it to be charged by means of only the power rectifier 2 or power rectifier/inverter 4 when the residual capacity is increased. More particularly, when a residual capacity Qr of the storage battery 7 is below a first reference capacity Q1, the control unit 8 permits the storage battery 7 to be charged by means of both power rectifier 2 and power rectifier/inverter 4 while preventing the charging current from exceeding a first upper limit set value or level C1 predetermined on the basis of a sum of capacities of the power rectifier 2 and power rectifier/inverter 4. Also, when the residual capacity Qr of the storage battery 7 exceeds a second reference capacity Q2 above the first reference capacity Q1, the control unit 8 functions to permit the battery 7 to be charged by means of only either the power rectifier 2 or the power rectifier/inverter 4 while preventing the charging current from exceeding a second upper limit set value or level C2 predetermined on the basis of a capacity of one of the power rectifier 2 and power rectifier/inverter 4 which is reduced in capacity. When the power rectifier 2 is normally operated, floating charge of the storage battery 7 is normally carried out by means of the power rectifier 2. When the power rectifier 2 fails, the storage battery 7 is charged by means of the power rectifier/inverter 4 until repair or replacement of the power rectifier 2 is completed.

The control unit 8 also functions to control the power inverter 3 and change-over unit 5. However, such function of the control unit 8 is not essential in the present invention.

Construction of the control unit 8 which constitutes one of features of the present invention is shown in FIG. 2 by way of example. The control unit 8 includes a rectifier/inverter control means 80 for controlling the power rectifier 2 and power rectifier/inverter 4. The rectifier/inverter control means 80 includes a voltage detecting means 81, a voltage control means 82, a drive signal generating means 83, a set voltage determining means 86 including a droop control section or means 84 and a limit value or level setting section or means 85, a residue capacity judging means 87, and a switch change-over command generating means 88. The control unit 8 includes in addition to the above-described means, a means for generating a control signal required to execute both a normal power failure-free feed function of the power failure-free power supply apparatus and a function for operating the power rectifier/inverter 4 in place of the power rectifier 2 and power inverter 3 when the power rectifier 2 and power inverter 3 fail.

The voltage detecting means 81 functions to detect a battery voltage of the storage battery 7. The voltage control means 82 is fed with an output of the voltage detecting means 81 and that of the set voltage determining means 86 to output to the drive signal generating means 83 a control signal CS acting to approach the battery voltage of the storage battery 7 to an internally set voltage. The drive signal generating means 83 receives the control signal CS to output a drive signal for driving a plurality of semiconductor switches constituting the power rectifier 2 and power rectifier/inverter 4.

Now, the manner of operation and function of the residual capacity judging means 87 will be described hereinafter. First, it operates the amount of power charged and discharged on the basis of both charging and discharge currents detected by the current detector 10 and a battery voltage detected by the voltage detecting means 81. Results of the operation are integrated or accumulated to obtain accumulated charged power and accumulated discharged power, resulting in obtaining the residual capacity by subtracting the accumulated discharged power from the accumulated charged power. The operation is carried out in view of a variation in ambient temperature and a deterioration in battery. The residual capacity thus obtained is compared with the first and second reference capacities Q1 and Q2 (Q1>Q2) in the residual capacity judging means 87. The first reference capacity Q1 acts as a reference for judging whether or not it is required to charge the storage battery 7 while operating the power rectifier 2 and power rectifier/inverter 4 in parallel. The second reference capacity Q2 acts as a reference for judging whether or not the storage battery 7 is charged by only one of the power rectifier 2 and power rectifier/inverter 4. The residual capacity judging means 87 commands the limit level setting means 85 to change the upper limit set level and commands the switch changer-over command generating means 88 that change-over of the switches is required, when the residual capacity of the storage battery 7 is at a level below the first reference capacity Q1 and the battery is permitted to be fed with an AC power from the AC power supply 1. The limit level setting means 85, when it receives the command, outputs the first upper limit set level described below to the droop control means 84. The switch change-over command generating means 88, when receiving the command, outputs a change-over command for rendering the switches S1 and S2 closed. When it is judged that the residual capacity of the storage battery 7 is above the second reference capacity Q2 or exceeds it, the limit level setting means is commanded to change the upper limit set level and the switch change-over command generating means 88 is commanded that change-over of the switches is required. The limit level setting means 85, when it receives the command, outputs the second upper limit set level to the droop control means 85. Also, the switch change-over command generating means 88, when it receives the command, outputs a change-over command for rendering the switch S2 closed and the switch S1 open. The switch change-over command generating means 88 outputs a command for closing the switch S2 and opening the switch S1 when any failure occurs in the power rectifier 2.

The set voltage determining means 86 receives results of judgment from the residue capacity judging means 87 to carry out predetermined operation. More particularly, the limit level setting means 85 sets an upper limit set level so that conversion power for one conversion unit is not rendered excessive during sole operation or driving. Also, during parallel operation, the limit level setting means 85 sets the upper limit set level within a range which prevents conversion power for two conversion units from being excessive depending on the storage battery 7. More specifically, when it is judged that the residual capacity of the storage battery 7 is below the first reference capacity Q1, the set voltage determining means 86 outputs, to the voltage control means 82, a set voltage change command Vr for changing a set voltage for preventing a charging current detected by the current detector from exceeding a first upper set level CR1 for the purpose of parallel driving or operation of the power rectifier 2 and power rectifier/inverter 4. The first upper limit set level CR1 set by the limit value setting section 85 is determined on the basis of a sum of a capacity of the power rectifier 2 and that of the power rectifier/inverter 4. More specifically, when a charging current which is permitted to flow to the storage battery 7 on the basis of the sum is reduced as compared with a maximum charging current permitted depending on performance of the storage battery, the charging current permitted to flow to the battery based on the sum is set at a level identical with the first upper limit set level CR1. In the contrary case, the maximum charging current is set at the upper limit set level CR1. The droop control means 84 functions to obtain a difference between the first upper limit set level CR1 and the charging current detected by the current detector 10 to output, to the voltage control means 82, the set voltage command Vr for setting a set voltage which permits the charging current to approach the first upper limit set level CR1. The set voltage thus set is varied depending on a variation in charging current detected by the current detector 10. The droop control means 84 increases the set voltage in order to increase the charging current at an initial charging stage and gradually reduces or droops the set voltage with a reduction in charging current. The voltage control means 82 feeds the drive signal generating means 83 with a control signal which permits constant-voltage control to take place so that the battery voltage is at a level of the set voltage.

When the residual capacity judging means 87 judges that the residual capacity of the storage battery 7 is above the second reference capacity Q2 or exceeds it, the limit level setting section 85 feeds the droop control means with a command for changing the set level from the first upper limit set level CR1 to a second upper limit set level CR2. The second upper limit set level CR2 is determined on the basis of a capacity of one of the power rectifier 2 and power rectifier/inverter 4 which is reduced in capacity. Thus, the second upper limit set level is set to be below a level of the maximum charging current which one of the power rectifier 2 and power rectifier/inverter 4 which is reduced in capacity can output. The second upper limit set level is a level set when floating charge takes place. The droop control means 84 outputs a set voltage command Vr for indicating a set voltage required to prevent a charging current detected by the current detector 10 from exceeding the second upper limit set level. The set voltage at this time may be fixed so long as the charging current is at the second upper limit set level or below.

Such construction prevents conversion power from being excessive, resulting in protecting the semiconductor switches which constitute the power rectifier 2 and power rectifier/inverter 4.

Now, the manner of operation of the power failure-free power supply apparatus of the illustrated embodiment will be described hereinafter.

<Normal Operation Mode>

This is an operation mode taking place under the conditions that the storage battery 7 is kept fully charged and the power rectifier 2 and power inverter 3 are kept operable. The switch S1 is closed and the power rectifier 2 converts AC power of the AC power supply 1 into DC power to feed it the power inverter 3 and charge the storage battery 7. The power inverter 3 converts the DC power to AC power and the change-over unit 5 selects an output of the power inverter 3 to feed it to the load 6. The power rectifier/inverter 4 carries out stand-by operation in reserve in view of failure of the power inverter 3.

<Operation Mode during Power Failure>

This is an operation mode taking place using power discharged from the storage battery 7 during power failure of the AC power supply. When power failure occurs in the AC power supply 1, operation of the power rectifier 2 is stopped and the power inverter 3 converts DC power obtained due to discharge of the storage battery 7 into AC power to feed it to the load 6. The power rectifier/inverter 4 carries out stand-by operation.

<Operation Mode during Failure of Power Inverter>

This is an operation mode carried out when failure occurs in the power inverter 3 which feeds power to the load 6. When the failure occurs, the change-over unit selects an output of the power rectifier/inverter 4, so that the load 6 is fed with power from the power rectifier/inverter 4 which has carried out standby operation. Repair of the power inverter 3 is made and then the change-over unit 5 selects an output of the power inverter 3, resulting in the apparatus being returned to the normal operation mode.

<Operation Mode during Failure of Power Rectifier>

This is an operation mode when failure occurs in the power rectifier 2 fed with power from the AC power supply 1. When failure occurs in the power rectifier 2, the power inverter 3 converts power of the storage battery 7 to feed it to the load 6. The power rectifier/inverter 4 is changed over from the stand-by operation in the power inverting operation to the power rectifying operation. This permits the switch S1 to be rendered open and the switch S2 to be closed, so that the power rectifier/inverter 4 may be operated in place of the power rectifier 2. This permits the power rectifier/inverter 4 to convert AC power of the AC power supply 1 into DC power, which charges the storage battery 7 and is fed to the power inverter 3. When the power rectifier 2 is repaired, the switch S2 is rendered open and the switch S1 is closed, resulting in the power rectifier/inverter 4 being directed to power inverting operation, so that the apparatus may be returned to the normal operation mode.

<Charging Mode of Battery Increased in Capacity>

In order to operate the load 6 when power failure of the AC power supply 1 extends over a long period of time, the storage battery 7 is increased in capacity. An increase in capacity of the storage battery 7 leads to an increase in power charged, so that charging of the storage battery 7 by means of only the power rectifier 2 which has a capacity determined in correspondence to a capacity of the power inverter 3 causes charging time to be considerably increased. In this instance, when discharge of the storage battery 7 proceeds to a considerable level, the power rectifier/inverter 4 is subject or directed to power rectifying operation and the switch S2 is closed, resulting in the power rectifier/inverter 4 being directed to parallel operation or operation in parallel to the power rectifier 2. When detection of a charging current to the storage battery 7 by the current detector 10 reveals that the charging current can be fed by only a capacity of the power rectifier 2 due to advance of charging of the battery or that the residual capacity of the storage battery 7 exceeds the second reference capacity Q due to charging, the switch S2 is closed to subject or direct the power rectifier/inverter 4 to power inverting operation, so that the power supply apparatus may be returned to the normal operation mode.

In the illustrated embodiment, in the normal operation mode, the power rectifier 2 charges the storage battery 7. In the operation mode during failure of the power rectifier, the power rectifier/inverter 4 is driven in place of the power rectifier 2 for charging of the storage battery 7. Further, in the mode wherein the battery increased in capacity is charged, the power rectifier and power rectifier/inverter 4 are subject to parallel operation, resulting in the storage battery 7 being charged. Sole operation of the power rectifier 2 or power rectifier/inverter 4 in the normal operation mode or the operation mode during failure of the power rectifier is highly different in power rectifying power and charging current from parallel operation of the units 2 and 4. Thus, the illustrated embodiment is constructed so as to judge the sole operation and parallel operation, to thereby vary a set level of the limit level setting means 85.

Figure 3:
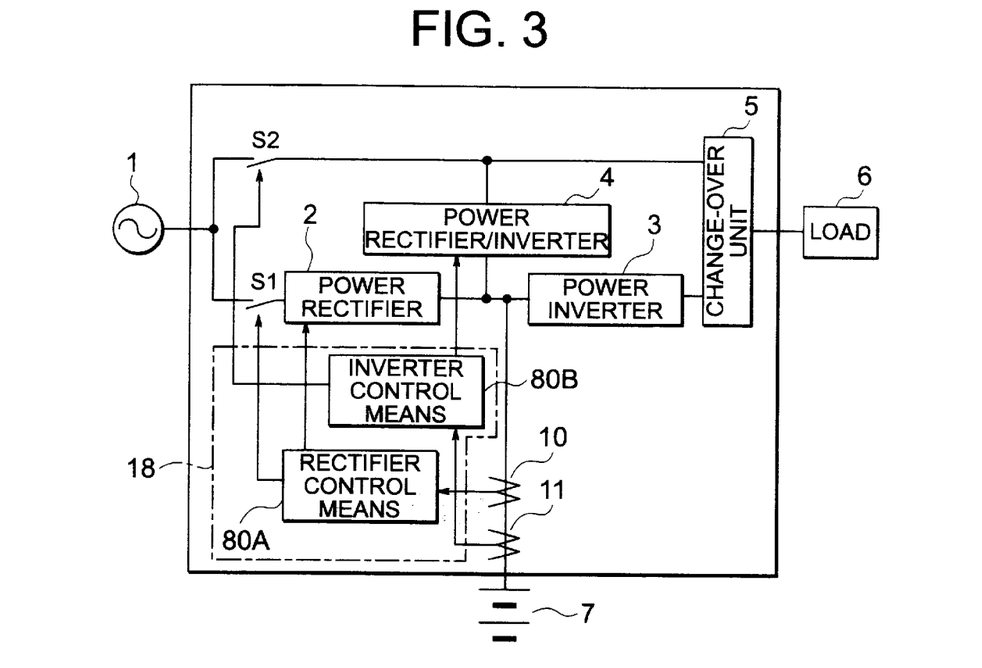
FIG. 3 is a block diagram showing a second embodiment of a power failure-free power supply apparatus according to the present invention.

Referring now to FIG. 3, a second embodiment of a power failure-free power supply apparatus according to the present invention is illustrated. In a power failure-free power supply apparatus of the illustrated embodiment, a second current director 10 is arranged and a control unit 18 includes a first converter control means or rectifier control means 80A and a second converter control means or rectifier/inverter control means 80B for separately controlling a power rectifier 2 and a power rectifier/inverter 4, respectively. Also, the first and second converter control means 80A and 80B are constructed so as to separately control first and second switches S1 and S2, respectively. The first and second converter control means 80A and 80B may be constructed in substantially the same manner as the rectifier/inverter control means 80 described above with reference to FIG. 2. In this instance, when the second converter control means 80B is constructed so as to determine whether or not charging operation takes place, the illustrated embodiment may automatically carry out parallel operation and sole operation. The remaining part of the illustrated embodiment may be constructed in substantially the same manner as the embodiment described above.

Figure 4:
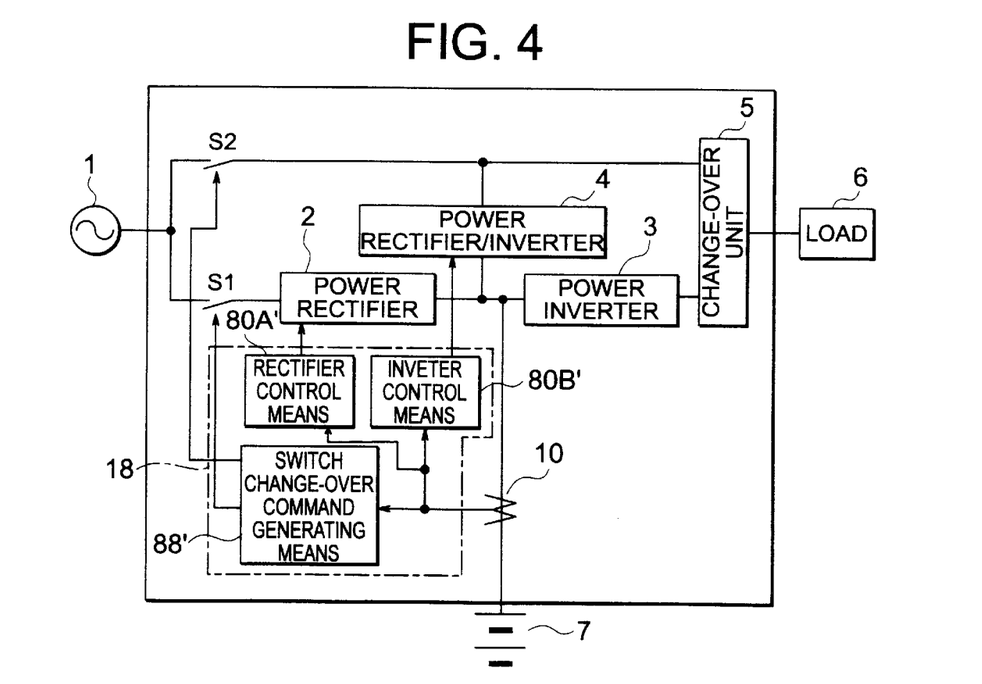
FIG. 4 is a block diagram showing a third embodiment of a power failure-free power supply apparatus according to the present invention.

Referring now to FIG. 4, a third embodiment of a power failure-free power supply apparatus according to the present invention is illustrated. In a power supply apparatus of the illustrated embodiment, a single current detector 10 is arranged so as to feed information on a charging current detected thereby to first and second converter control means 80'A and 80'B. Also, the first and second converter control means 80'A and 80'B are provided with a single switch change-over command generating means 88' common to both. The remaining part of the illustrated embodiment may be constructed in substantially the same manner as the second embodiment described above with reference to FIG. 3.

Operation of the second and third embodiments described above may be carried out in substantially the same manner as the first embodiment described above.

As can be seen form the foregoing, the present invention is constructed so as to permit a charging current increased as compared with in the prior art to be flow to the storage battery in the charging mode of the battery increased in capacity while subjecting the power rectifier and power rectifier/inverter to parallel operation, so that charging time of the battery in the parallel operation may be significantly reduced as compared with the prior art. This permits the power rectifier/inverter to be rapidly returned to the normal operation mode in which it carries out stand-by operation in reserve in view of failure of the power inverter, so that a deterioration in operational reliability may be substantially restrained.

The control unit may be constituted of the first and second converter control means to independently carry out controls of the power rectifier and power rectifier/inverter. This results in the reliability being further enhanced.

Also, the present invention effectively protects the semiconductor switches for the power rectifier and power rectifier/inverter and takes out maximum convertible rectifying power in each of parallel operation of the power rectifier and power rectifier/inverter and sole operation of one of both. The present invention permits potentiality of the converters to be fully directed to charging of the battery.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A power failure-free power supply apparatus comprising:
   a power rectifier including an AC terminal and a DC terminal and converting AC power into DC power;
   a power inverter including an AC terminal and a DC terminal and converting DC power into AC power;
   a power rectifier/inverter including an AC terminal and a DC terminal and selectively carrying out both power rectification for converting AC power into DC power and power inversion for converting DC power into AC power;
   a storage battery including a DC terminal of which one end is connected to a common connection of said DC terminals of said power rectifier, power inverter and power rectifier/inverter;

a current detector arranged between said common connection and said battery to detect a charging current of said storage battery; and a control unit controlling operation of at least said power rectifier and power rectifier/inverter;

said control unit controlling operation of said power rectifier and power rectifier/inverter so as to charge said storage battery by means of said power rectifier and power rectifier/inverter when a residual capacity of said storage battery is reduced and charge said storage battery by means of only one of said power rectifier and power rectifier/inverter when the residual capacity is increased while preventing the charging current from exceeding an upper limit set level depending on an output of said current detector.

2. A power failure-free power supply apparatus as defined in claim 1, wherein said upper limit set level is determined on the basis of a sum of a capacity of said power rectifier and that of said power rectifier/inverter;

said upper limit set level at which said storage battery is charged by means of only one of said power rectifier and power rectifier/inverter is determined on the basis of a capacity of one of said power rectifier and power rectifier/inverter which is reduced in capacity.

3. A power failure-free power supply apparatus comprising:

a power rectifier including an AC terminal and a DC terminal and converting AC power into DC power;

a power inverter including an AC terminal and a DC terminal and converting DC power into AC power;

a power rectifier/inverter including an AC terminal and a DC terminal and selectively carrying out both power rectification for converting AC power into DC power and power inversion for converting DC power into AC power;

a first switch connecting said AC terminal of said power rectifier to an AC power supply;

a second switch connecting said AC terminal of said power rectifier/inverter to said AC power supply;

a change-over unit selectively connecting said AC terminal of said power rectifier/inverter and said AC terminal of said power inverter to a load;

a storage battery including a DC terminal of which one end is connected to a common connection of said DC terminals of said power rectifier, power inverter and power rectifier/inverter;

a current detector arranged between said common connection and said battery to detect a charging current of said storage battery; and a control unit controlling operation of said first and second switches and operation of said power rectifier and power rectifier/inverter;

said control unit controlling operation of said first and second switches and operation of said power rectifier and power rectifier/inverter so as to charge said storage battery by means of said power rectifier and power rectifier/inverter when a residual capacity of said storage battery is reduced and charge said storage battery by means of only one of said power rectifier and power rectifier/inverter when the residual capacity is increased while preventing the charging current from exceeding an upper limit set level depending on an output of said current detector.

4. A power failure-free power supply apparatus as defined in claim 3, wherein said control unit includes first and second converter control means for separately controlling said power rectifier and power rectifier/inverter, respectively.

5. A power failure-free power supply apparatus as defined in claim 3, wherein said control unit includes a droop control means for controlling operation of said power rectifier and power rectifier/inverter so as to prevent said charging current from exceeding said upper limit set level when said power rectifier and power rectifier/inverter are subject to parallel operation or individually operated; and a limit level setting means for varying said upper limit set level between parallel operation of said power rectifier and power rectifier/inverter and individual operation thereof.

6. A power failure-free power supply apparatus comprising:

a power rectifier provided with AC terminals and a DC terminal, including a plurality of semiconductor switching elements and converting AC power inputted from an AC power supply through said AC terminals thereof thereto into DC power;

a storage battery charged by means of said DC power outputted from said power rectifier;

a power inverter provided with AC terminals and a DC terminal, including a plurality of semiconductor switching elements and converting DC power fed thereto through said DC terminal thereof from said power rectifier or DC power fed thereto from said storage battery into AC power to output it to said AC terminals thereof;

a power rectifier/inverter provided with AC terminals and a DC terminal, connected at said DC terminal thereof to said DC terminals of said power rectifier and power inverter, including a plurality of semiconductor switching elements, and converting AC power inputted thereto through said AC terminals thereof into DC power to output it from said DC terminal thereof and reverse-converting DC power inputted thereto through said DC terminal thereof into AC power to output it through said AC terminals thereof;

switches selectively connecting said AC terminals of said power rectifier/inverter and said AC power supply to each other;

a change-over unit selectively connecting said AC terminals of said power inverter and said AC terminals of said power rectifier/inverter to a load;

a current detector detecting a current flowing through a connection line which connects a common connection of said DC terminals of said power rectifier, power rectifier/inverter and power inverter to said storage battery; and a control unit controlling at least changing-over of said switches and operation of said power rectifier and power rectifier/inverter;

said control unit carrying out controlling of changing-over of said switches and operation of said power rectifier and power rectifier/inverter so that said storage battery is charged by both said power rectifier and power rectifier/inverter while preventing a charging current from exceeding a first upper limit set level determined on the basis of a sum of a capacity of said power rectifier and that of said power rectifier/inverter when a residual capacity of said storage battery is below a first reference capacity and so that said storage battery is charged by only one of said power rectifier and power rectifier/inverter while preventing said charging current from exceeding a second upper limit set level determined on the basis of a capacity of one of said power rectifier and power rectifier/inverter which is reduced in capacity when the residual capacity of said storage battery is above a second reference capacity above said first reference capacity.

7. A power failure-free power supply apparatus as defined in claim 6, wherein said control unit includes a rectifier/inverter control means for controlling said power rectifier and power rectifier/inverter;

said rectifier/inverter control means including:

a drive signal generating means outputting a drive signal for driving said power rectifier and power rectifier/inverter;

a voltage detecting means for detecting a battery voltage of said storage battery;

a voltage control means outputting a control signal for bringing said battery voltage into a set voltage to said drive signal generating means; and a set voltage determining means;

said set voltage determining means feeding said voltage control means with a set voltage change command for changing said set voltage so as to prevent said charging current from exceeding said first upper limit set level when said power rectifier and power rectifier/inverter are subject to parallel operation;

said set voltage determining means feeding said voltage control means with said set voltage change command so as to prevent said charging current from exceeding said second upper limit set level when only one of said power rectifier and power rectifier/inverter is operated.

8. A power failure-free power supply apparatus as defined in claim 6, wherein said control unit includes a first converter control means and a second converter control means for separately controlling said power rectifier and power rectifier/inverter, respectively.

9. A power failure-free power supply apparatus as defined in claim 8, wherein said first and second converter control means separately control said first and second switches, respectively.

10. A power failure-free power supply apparatus as defined in claim 8, wherein said current detector is separately arranged for each of said first and second converter control means.

* * * * *